N. A. NEWDICK.
CABLE REELING MECHANISM FOR ELECTRIC LOCOMOTIVES.
APPLICATION FILED NOV. 29, 1905.
1,125,152.
Patented Jan. 19, 1915.
2 SHEETS—SHEET 2.
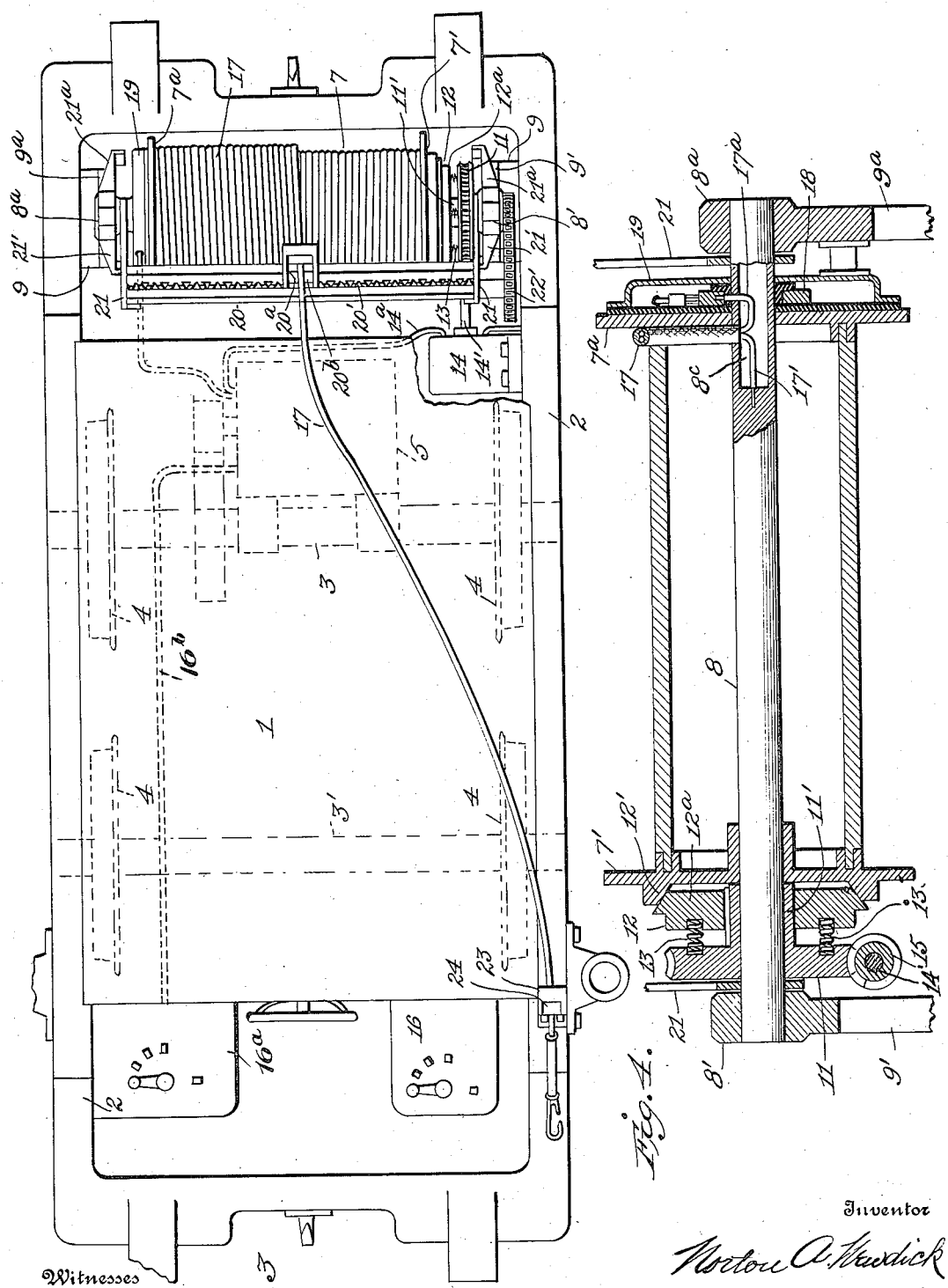

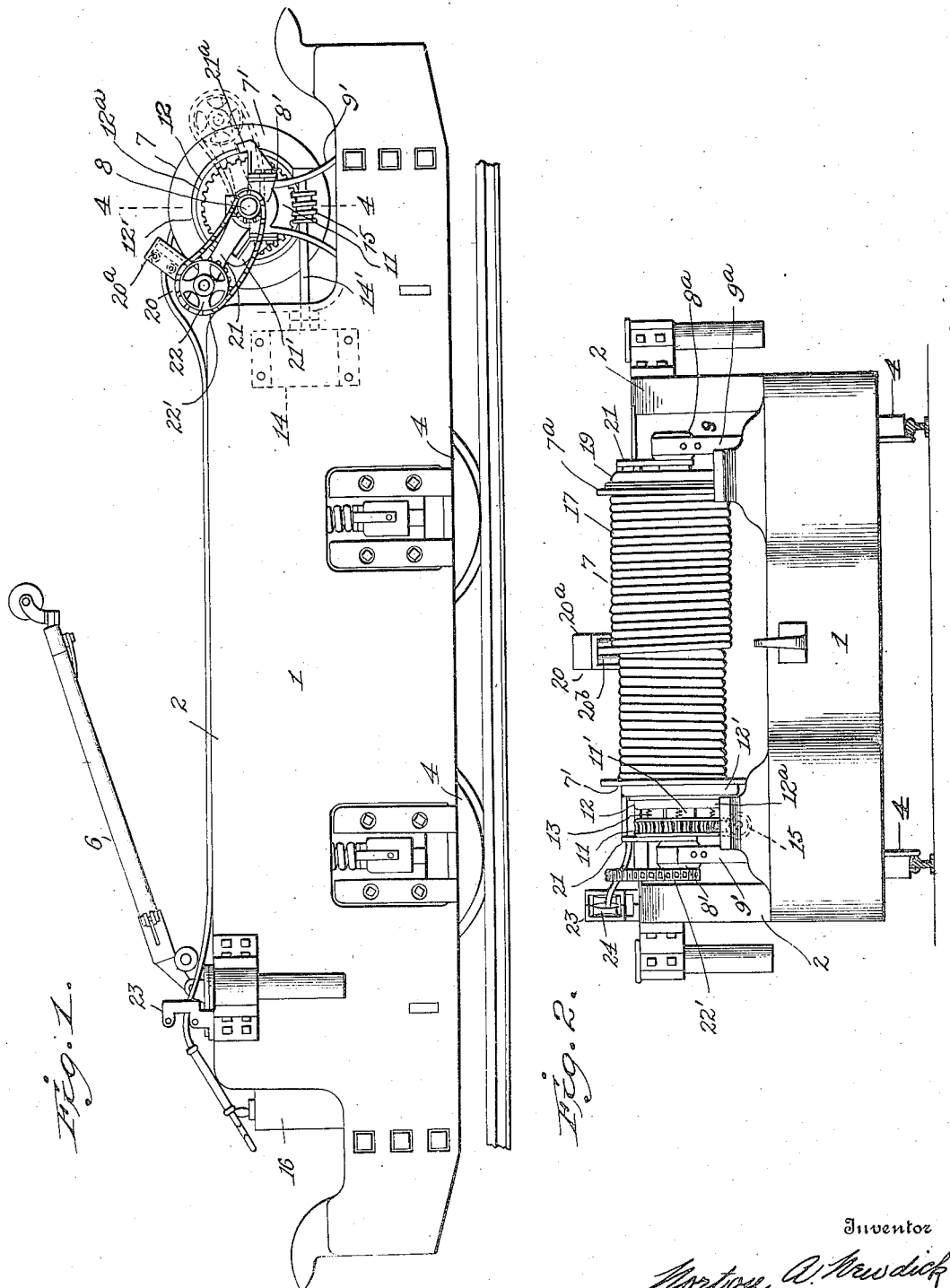

UNITED STATES PATENT OFFICE.

NORTON A. NEWDICK, OF COLUMBUS, OHIO, ASSIGNOR, BY MESNE ASSIGNMENTS, TO THE JEFFREY MANUFACTURING COMPANY, A CORPORATION OF OHIO.

CABLE-REELING MECHANISM FOR ELECTRIC LOCOMOTIVES.

1,125,152.

Specification of Letters Patent.

Patented Jan. 19, 1915.

Application filed November 29, 1905. Serial No. 289,640.

*To all whom it may concern:*

Be it known that I, NORTON A. NEWDICK, a citizen of the United States, residing at Columbus, in the county of Franklin and State of Ohio, have invented certain new and useful Improvements in Cable-Reeling Mechanism for Electric Locomotives, of which the following is a specification, reference being had therein to the accompanying drawing.

This invention relates to improvements in cable reeling mechanism for an electric locomotive.

One object is to simplify the operation of the winding and unwinding of a cable upon a reel carried by an electric locomotive, and to provide means operating by external power whereby the reel will be rotated to wind up the cable irrespective of the rotation or slippage of the locomotive track-wheels on their rails, and irrespective of and independent of the operation of the motors which actuate the locomotive track wheels.

Another object is to provide in the train of power transmitting mechanism for actuating the reel a friction clutch, one element of which is driven by self and automatically locking gearing elements while the other element is directly connected to the reel so as to rotate therewith in either direction, this arrangement of parts insuring that the elements of the friction clutch will operate as a retarding device or friction brake when there is any tendency of the reel to rotate the friction clutch.

For the purpose of illustration I have shown in the drawings an electric locomotive of the type preferable for mine work and provided with a reel and reel-driving mechanism embodying my improvements.

Figure 1 is a side elevation of a locomotive provided with a cable reel and cable reel-driving devices embodying my improvements. Fig. 2 is an end elevation of the same. Fig. 3 is a top plan view of the same. Fig. 4 is a vertical section on the line 4—4, Fig. 1.

In the drawings, 1 indicates as an entirety, an electric locomotive of any desired type.

2 indicates the frame of the locomotive, 3, 3', the front and rear axles respectively, and 4 the track wheels on the axles.

5 indicates a motor mounted on the framework of the locomotive and geared to either one or both of the said axles, in any well known manner, so as to furnish power for rotating the track-wheels.

6 indicates as an entirety a trolley mechanism adapted to engage a current-supply conductor and to conduct the current to the motor on the car.

The mechanism for controlling the operation of the locomotive, such as the electric controller 16$^a$ for the propulsion motor 5, the brake operating devices, and the circuit breaker, are preferably located at one end of the locomotive. 16$^b$ indicates diagrammatically a set of connecting wires which may be of any of the well known sorts ordinarily used for connecting a railway motor of this class with its controller. At the opposite end of the locomotive I prefer to mount the cable reel and the mechanism for driving it.

7 indicates as an entirety a cable reel. This reel may be of any preferred shape and of any desired size, and for the purpose of illustration, I have shown it mounted horizontally upon the locomotive, although my invention is not limited to the exact form of reel shown.

8 is a horizontally arranged reel shaft upon which the reel 7 is mounted. The shaft is supported at either end in bearings 8', 8$^a$, carried by the standards 9', 9$^a$, respectively, of the reel-supporting frame 9 which is rigidly secured to the locomotive frame.

11 is a worm wheel loosely mounted upon the shaft 8 and having an inwardly extending hub 11'.

12 indicates as an entirety a friction clutch interposed between the said worm wheel 11 and the adjacent end of the cable reel 7. This clutch may be of any well known construction. For the purpose of illustration I have indicated the flange 7' as carrying a laterally stationary and cupped member 12' of the said friction clutch. This element may either be formed integrally with or may be detachably connected to the said flange 7'.

12$^a$ indicates a laterally movable and cone-shaped element of the friction clutch, which is adapted to engage with the conical walls of the element 12'. This movable element of the clutch is preferably splined to the hub 11' on the worm wheel 11 so as to be capable of movement therealong.

13, 13 indicate a series of helical springs interposed between the inner face of the worm wheel 11 and the adjacent face of the movable element 12ª of the friction clutch and adapted normally to press the movable element of the clutch away from the worm wheel and into engagement with the stationary element of the clutch. The parts referred to as constituting a friction clutch can also be considered as slippage elements in the train of power transmission mechanism, of which many forms are known.

14 indicates an electric motor mounted on the frame of the locomotive 1 at the same side thereof as the worm wheel 11 and preferably in the same plane therewith. I prefer to mount this motor with its armature shaft 14' arranged longitudinally of the machine and in the vertical plane of the worm wheel 11. This armature shaft extends forward beneath the said worm wheel 11 and has secured to it a worm 15 which is adapted to mesh with and transmit power to the worm wheel.

16 indicates a controller of any suitable type which may be located within easy reach of the operator and is adapted to control the rotation of the motor 14 with which it may be connected by any suitable wiring.

The cable for the cable reel may be of any well known type and either a single wire cable or a double wire cable, as may be desired.

In Fig. 4 of the drawings for the purpose of illustration, I have indicated a double wire cable 17 the reel end of which extends through the periphery or drum of the reel and into the interior thereof, and is there separated, and one conductor 17' is led off in one direction through a passageway 8ᶜ through the reel shaft 8 and is grounded to the locomotive frame in any desired manner, and the other conductor 17ª is led off in the opposite direction through the said passageway 8ᶜ and is connected to a collector ring 18 which is insulated from the drum. This collector ring may be of any desired type and it is electrically connected with the driving motor or motors on the car in any suitable manner.

19 is a housing carried by the adjacent standard 9ª of the reel and adapted to incase and protect the collector and its brush mechanism from dust, dirt and the like.

20 indicates as an entirety a spooling device for spooling the cable upon the reel. It may be of any suitable construction and should be adapted for spooling the cable whether it be paid off from the reel end or the operator's end of the locomotive. I have illustrated this spooling device conventionally as comprising a double threaded shaft 20' carrying a traveler 20ᶜ, which in turn has secured to it a frame in which is mounted guide rollers 20ᵇ for the cable. This double threaded shaft is mounted at either end in bearing plates or arms 21 which, at their inner ends, are loosely mounted on the reel shaft 8 so as to be swung about the axis of the said shaft.

21', 21ª, are arms or brackets secured at the sides of the bearing standards 9 and 9ª respectively, and adapted, one pair to engage and support the double threaded shaft at one side of the reel, and the other pair to engage and support the said shaft on the other side of the reel. 22 is a sprocket wheel rigidly secured to the said double threaded shaft at one end, and connected by a chain 22' with a sprocket wheel on the reel shaft 8.

When the cable is to be paid off from the operator's end of the locomotive it is desirable to have it guided therefrom by some suitable device, and for this purpose I have provided a frame 23 carrying the cable guide-rollers 24.

The current for actuating the motor 14 may be taken off from the supply circuit to the locomotive in any desired way, and for illustration I have simply indicated a conductor 14ª leading from the said motor to the conductor which leads from the collector ring 18 to the motor or motors 5 for driving the track-wheels.

The operation of the mechanism will be readily understood: Assuming that the locomotive is at a fixed point from which it is desired to use the cable reel, the free end of the cable 17 is electrically connected in any suitable manner to the line circuit for the locomotive and current is then supplied through the said cable to the driving motor or motors on the car, and the locomotive moves away from the said point. At this time, that is when it is desired to pay out cable, the motor 14 may be permitted to remain idle and as the power-transmitting devices between this motor and the cable reel are self-locking, the worm wheel will be held stationary and therefore the movable clutch element 12ª carried thereby, and hence the friction clutch will operate as a friction brake to prevent the running away of the reel and back-lashing of the cable. When the locomotive has moved as far away from the fixed point as desired, and is again ready to return toward the said point, the operator throws the controller 16 so as to supply current to the motor 14 and cause the rotation of its armature shaft 14' in such direction as to wind up the cable 17 thereon as the locomotive moves toward the said fixed point. The rate of rotation of the said reel relative to the rate of travel of the locomotive may be regulated and provided for in any suitable manner. In case the reel should operate somewhat faster than desired, it will be noted that slippage may and will occur between the elements of the friction clutch 12 and thus compensate for the difference in travel of the locomotive relative to the reel and thereby prevent undue stretching and straining of the cable.

It will be noted that since the motor 14 for driving the cable reel is actuated entirely independently of the locomotive track-wheels, it may be operated to effect the winding up of the cable upon the reel irrespective of which end of the locomotive the cable has been paid off from, and is therefore in advance as the locomotive returns toward the said fixed point where the cable is connected to the main conductor, and during this travel of either end toward the said fixed point the cable will be wound upon the reel. Again owing to the independence of drive for the truck wheels and the reel and since the motor for driving the reel has its own separate controller, the speed of rotation of the reel relative to the speed of travel of the locomotive may be varied at will.

It will be seen that the friction brake or retarding device acts constantly and with substantial uniformity upon the cable reel or drum so that the latter is held from overrunning under all circumstances, as when much or little of the cable is wound thereupon, and whether its motor is running or at rest. The supplemental motor for driving the reel, being independent of the motor that drives the track wheels, and under the control of the operator, is always in condition for instant use as occasion may require, being as efficient for turning the reel when the last portion of a long cable is being wound thereupon as when the attached end is being wound, and vice versa.

While I have shown in the drawings a motor for actuating the cable reel which is separate and independent from the driving motors for the locomotive track wheels, it will be understood that the self locking or automatically locking feature of the train of power transmitting devices for driving the reel may be employed in connection with any rotary shaft on the locomotive irrespective of how it is driven.

The controlling of the elements of a friction clutch in a train of power transmitting mechanism for driving a cable reel by means of a worm and worm wheel I believe to be solely novel to my apparatus.

The correlation of the worm, worm wheel and the elements of the friction clutch is such that the friction elements of the clutch become retarding devices when there is any tendency of the worm wheel to rotate in either direction independently of the worm, the gears automatically locking to prevent such relative rotation, and compensation between the elements of the friction clutch and the reel being furnished by slippage of said elements relatively to each other. When desired the friction clutch, worm and worm wheel may be located at other points in the power transmission system for the reel than on the reel shaft, as shown in the drawings in this application for illustration purposes.

When the locomotive is moving away from the fixed end of the cable and the reel is rotating in an unwinding direction, as has been above pointed out, the self-locking worm gearing holds the driving element $12^a$ of the friction clutch 12 against backward movement and the movement of the reel is steadied and it is prevented from unwinding the cable too rapidly. Such a steadying of the reel rotation is especially to be desired when the locomotive is slowing up. When desired it is possible to energize the reel motor in the direction to tend to wind the reel with the result that the clutch element $12^a$ is rotated in the opposite direction from that of the clutch element $12'$. In this manner the power of the motor tends to oppose the unwinding movement of the reel. Obviously, when the motor is thus allowed to operate during the unwinding movement of the reel, it exerts a winding torque upon the winding device or reel; and when the operation of the motor is continuous, a winding torque is exerted upon the winding device during the movement of the vehicle in either direction.

I do not herein claim any specific form of circuit connection or controller for the reel motor, many suitable forms, whether simple switches or current varying devices, being well known, but a device such as that indicated is preferred.

What I claim is—

1. In a cable reeling mechanism for an electric locomotive, the combination with a locomotive frame, supporting track wheels therefor, an electric motor on said frame for driving said track wheels and a cable reel on the frame, of a second electric motor secured to said locomotive frame and independent of said locomotive motor and said track wheels, power transmitting mechanism interposed between said motor and said cable reel and means controllable by the operator for opening and closing the circuit of the said reel motor.

2. In a cable reeling mechanism for an electric locomotive, the combination with a locomotive frame, the supporting track wheels therefor, and the motor for driving the locomotive, of a cable reel, an electric motor carried by said locomotive frame and independent of said locomotive track wheels, power transmitting devices interposed between said motor and said reel and means controllable by the operator for opening and closing the circuit of the said reel motor.

3. In a cable reeling mechanism for an electric locomotive, the combination with the locomotive frame, the supporting track wheels therefor, and the motor carried by said frame and connected to said track wheels, of a cable reel mounted upon said frame, an electric motor on said frame independent of said locomotive track wheels, power transmitting mechanism connecting said reel-driving motor with the reel and means controllable by the operator for opening and closing the circuit of the said reel motor.

4. In a cable reeling mechanism for an electric locomotive, the combination with an electric locomotive of a cable reel mounted thereon, an electric motor independent of the locomotive-driving motor and of the locomotive track wheels, a train of power transmitting devices interposed between said reel-driving motor and the reel and having in said train a friction clutch and means controllable by the operator for opening and closing the circuit of the said reel motor.

5. In a cable reeling mechanism for an electric locomotive, the combination with an electric locomotive of a cable reel mounted thereon, an electric motor independent of the locomotive-driving motor and of the locomotive track wheels, and a train of power transmitting devices interposed between said reel-driving motor and the reel, and having in said train a friction clutch the elements of which are held yieldingly in engagement with each other.

6. In a cable reeling mechanism for an electric locomotive, the combination with an electric locomotive of a cable reel mounted thereon, an electric motor independent of the locomotive-driving motor and of the locomotive track wheels, and a train of power transmitting devices interposed between said reel-driving motor and the reel, and having in said train of power transmitting devices self-locking gearing and a friction clutch.

7. In a cable reeling mechanism for an electric locomotive, the combination with an electric locomotive of a cable reel mounted thereon, an electric motor independent of the locomotive-driving motor and of the locomotive track wheels, and a train of power transmitting devices interposed between said reel-driving motor and the reel, and having in said train of power transmitting devices self-locking gearing and a friction clutch, the elements of which are held yieldingly in engagement with each other.

8. In a cable reeling mechanism for an electric locomotive, the combination of an electric locomotive, a shaft mounted thereon, a cable reel loosely mounted on said shaft, a worm wheel on said shaft, driving connection between said worm wheel and said reel, an electric reel-driving motor secured to the locomotive frame and independent of the locomotive driving motors and of the locomotive track wheels, and power transmitting mechanism interposed between said motor and said worm wheel.

9. In a cable reeling mechanism for an electric locomotive, the combination of an electric locomotive, a shaft mounted thereon, a cable reel loosely mounted on said shaft, a worm wheel on said shaft, a friction clutch interposed between said worm wheel and said reel, an electric reel-driving motor secured to the locomotive frame and independent of the locomotive-driving motors and of the locomotive track wheels, and power transmitting mechanism interposed between said motor and said worm wheel.

10. In a cable reeling mechanism for an electric locomotive, the combination with an electric locomotive, of a reel mounted on said locomotive frame, a worm wheel mounted on said locomotive frame, a friction clutch interposed between said worm wheel and said reel, a reel-driving motor supported on said locomotive frame and independent of the locomotive-driving motor and of the locomotive track wheels, and power transmitting mechanism interposed between said reel-driving motor and said worm wheel.

11. In a cable reeling mechanism for an electric locomotive, the combination with an electric locomotive of a cable reel mounted on the locomotive frame, a worm wheel mounted on the locomotive frame, a friction clutch interposed between said worm wheel and said cable reel, the elements of which are normally held yieldingly in engagement with each other, an electric motor carried by said locomotive frame and independent of the locomotive-driving motor, and power transmitting mechanism interposed between said reel-driving motor and said worm wheel.

12. In a cable reeling mechanism for an electric locomotive, the combination with an electric locomotive, of a cable reel, a reel-driving motor carried by said locomotive and independent of the locomotive-driving motor and track wheels, a train of power transmitting devices interposed between said reel-driving motor and said reel, having in said train a friction clutch and means controllable by the operator for opening and closing the circuit of the said reel motor.

13. In a cable reeling mechanism for an electric locomotive, the combination with an electric motor for driving the track wheels, and a cable reel, of a motor independent of the track wheels and adapted to be under the control of the operator, for operating the cable reel, and power transmitting mechanism between the last said motor and the cable reel, substantially as set forth.

14. In a cable reeling mechanism for an electric locomotive, the combination with an electric motor for driving the track wheels thereof and a cable reel, of means acting substantially uniformly upon the reel to retard its free rotation, and a motor independent of the track wheels of the locomotive and arranged to be controlled by the operator for driving the reel through the said retarding device, substantially as set forth.

15. In a cable reeling mechanism for an electric locomotive, the combination with an electric motor for driving the track wheels thereof and a cable reel, of a motor independent of the track wheels for driving the reel, gearing between the said motor and reel including self-locking gearing, and means for retarding the free rotation of the reel and through which the power from the last said motor acts, the said means acting with substantial uniformity under all conditions, substantially as set forth.

16. In a cable reeling mechanism for an electric locomotive, the combination with an electric locomotive and a cable reel mounted on said locomotive, of a train of power transmitting devices interposed between a rotary shaft on said locomotive and said cable reel, and having in said train a friction clutch one element of which is driven by a worm wheel and worm.

17. In a cable reeling mechanism for an electric locomotive, the combination with an electric locomotive and a cable reel mounted thereon of a train of power transmitting devices interposed between a rotary shaft on said locomotives and said cable reel and having in said train a friction clutch one element of which is driven by self locking gearing.

18. In a cable reeling mechanism for an electric locomotive, the combination with an electric locomotive and a cable reel mounted thereon, of a train of power transmitting mechanism interposed between said cable reel and a rotary shaft on the locomotive, and having in said train a friction clutch one element of which is driven by gearing, self-locking to prevent the said element of the friction clutch from rotating or actuating it.

19. In a cable reeling mechanism for an electric locomotive, the combination with an electric locomotive of a cable reel mounted thereon, of a train of power transmitting devices interposed between said cable reel and a rotary shaft on the locomotive, and having in said train of power transmitting devices self-locking gearing and a friction clutch.

20. In a cable reeling mechanism for an electric locomotive, the combination with an electric locomotive of a cable reel mounted thereon, of a train of power transmitting devices interposed between said cable reel and a rotary shaft on the locomotive, and having in said train of power transmitting devices self-locking gearing and a friction clutch, the elements of which are held yieldingly in engagement with each other.

21. In a cable reeling mechanism for an electric locomotive, the combination with an electric locomotive and a cable reel mounted thereon, of means for rotating said reel and means for varying the speed of rotation of said reel independently of the speed of travel of the locomotive.

22. In a cable reeling mechanism for an electric locomotive, the combination with an electric locomotive and a cable reel mounted thereon, of a train of power transmitting mechanism interposed between the rotary shaft on said locomotive and said reel, and means for varying the speed of rotation of said reel relative to the speed of travel of said locomotive.

23. In a cable reeling mechanism for an electric locomotive, the combination with an electric locomotive and a cable reel mounted thereon, of means for rotating said reel, and means for varying the rate of speed at which said first described means rotates the reel relative to the speed of travel of the locomotive.

24. In a cable reeling mechanism for an electric locomotive, the combination with an electric locomotive and a cable reel mounted thereon, of an electric motor on said locomotive for driving said reel only, power transmitting means interposed between said reel driving motor and said cable reel, an electric controller for controlling the speed of rotation of the locomotive driving motor and an electric controller for controlling the speed of rotation of said independent motor.

25. The combination of the locomotive frame, the supporting track wheels therefor, the motor carried by said frame and connected to said track wheels, the cable reel adapted to move with said locomotive frame, a second electric motor also adapted to move with said frame and independent of said locomotive track wheels, power transmitting mechanism interposed between said second motor and the reel, and means controllable by the operator for making connections adapted to pass current through the said motor in the same direction irrespective of the direction of rotation of the locomotive motor.

26. The combination of a locomotive, the cable reel, the flexible cable adapted to be wound thereon at one end and to be secured and connected to a stationary conductor at the other end, a motor for propelling the locomotive bodily, a second and independent motor, gearing interposed between said second motor and the reel, and means controllable by the operator for making electrical connections adapted to pass current through the said motor in the same direction irrespective of whether the locomotive is moving toward the fixed end of the cable or away therefrom.

27. In combination, a vehicle adapted to move in forward and reverse directions, a winding device carried by said vehicle, and an electric motor having a driving connection with said winding device, said motor being connected and arranged to exert a winding torque upon said winding device during the movement of the vehicle in either direction.

28. In combination, a movable vehicle, a winding device for a flexible conductor carried by said vehicle, an electric motor having a driving connection with said winding device, a motor for driving said vehicle, and switch mechanism arranged to connect the motor for propelling the vehicle to the said conductor for rotation in either direction and to connect the other motor to the said conductor for rotation only in a direction to exert a winding torque upon said winding device.

29. In combination, a movable vehicle, a winding device carried thereby a flexible conductor on said winding device, means for securing the free end of said conductor to a fixed conductor, an electric motor having a driving connection with said winding device, and means for connecting said motor to said flexible conductor for operation in a direction to exert a winding torque upon said winding device during the movement of the vehicle in either direction.

30. In combination, a movable vehicle, a winding device carried thereby, a flexible conductor on said winding device, means for securing the free end of said conductor to a fixed conductor, an electric motor having a driving connection with said winding device, and means for connecting said motor to said flexible conductor for operation in a direction to exert a winding torque upon said winding device during the movement of the vehicle in either direction, the arrangement being such that the motor tends to wind up the flexible conductor at a greater rate than the rate of movement of the vehicle.

31. The combination of an electric locomotive, a cable reel mounted upon the locomotive, a conductor cable wound at one end upon the reel and adapted to be secured at the other end to a fixed conductor, means for conducting electricity from the reel end of the cable to the locomotive motor, power means for operating the reel, power transmitting gearing interposed between the said power means and the reel and including a friction clutch, the said power means being adapted to rotate the driving element of the said clutch in the same direction irrespective of the direction of rotation of the reel, the driving element of the clutch acting as a power transmitter to rotate the reel in winding-up direction and to retard the reel when rotating in an unwinding direction.

32. The combination of an electric locomotive, a cable reel mounted thereon, a flexible cable adapted to be wound thereon at one end and electrically connected to the electric locomotive motor at said end and to be secured and electrically connected to a stationary conductor at the other end, and power means so connected to the reel as to be adapted to act either to rotate the reel when the locomotive is moving in a direction to permit winding of the cable or to apply power tending to check the rotation of the reel when the locomotive is moving in an unwinding direction to cause paying out of the cable.

33. The combination of an electric locomotive, a motor for propelling the locomotive bodily, a cable reel mounted upon the locomotive, a flexible cable adapted to be wound thereon at one end and to be electrically connected to the said motor at the said end and to be secured and connected to a stationary conductor at the other end, a second and independent motor, power transmitting means connecting the second motor and the reel, and means for energizing the said motor to apply power to rotate the reel when the locomotive is moving in a direction to permit winding up of the cable and for energizing the motor to apply power tending to resist the rotation of the reel when the locomotive is moving in the direction to cause paying out of the cable.

In testimony whereof I affix my signature, in presence of two witnesses.

NORTON A. NEWDICK.

Witnesses:
   VICTOR H. BRUNSKOG,
   G. E. LYNCH.